United States Patent [19]

Kubota

[11] 3,728,477

[45] Apr. 17, 1973

[54] RECORDING AND REPRODUCING COLOR PICTURE INFORMATION

[75] Inventor: Yasuharu Kubota, Kanagawa, Japan

[73] Assignee: Sony Corporation, Tokyo, Japan

[22] Filed: Dec. 27, 1971

[21] Appl. No.: 211,918

[30] Foreign Application Priority Data

Dec. 28, 1970 Japan ..............................45/128495

[52] U.S. Cl.............................178/5.4 CD, 178/6.7 A

[51] Int. Cl.............................H04n 5/84, H04n 9/00

[58] Field of Search ......................178/5.4 CD, 6.7 A

[56] References Cited

UNITED STATES PATENTS 3,459,885 8/1969 Goldmark.......................178/5.4 CD 3,522,371 7/1970 Goldmark.......................178/5.4 CD

*Primary Examiner*—Howard W. Britton

*Attorney*—Lewis H. Eslinger et al.

[57] ABSTRACT

Successive scenes or fields of color picture information are recorded by exposing successive frames or portions of an elongated strip of radiant energy-sensitive record medium, for example, monochrome photographic film, to radiant energy in the form of light or an electron beam, and modulating the radiant energy for recording, in each of the frames or record medium portions information representing a composite signal which contains luminance and chrominance signals and an index signal having the same frequency as the color carrier for the chrominance signal and with the phase of either the index signal or the chrominance signal carrier, but not both, being reversed for successive color picture fields, that is in successive frames. In reproducing the recorded color picture information, the information recorded in the successive frames or record medium portions is detected to simultaneously reproduce first and second composite signals corresponding to two successive color picture fields, the chrominance and index signals are separated together from the first and second reproduced composite signals and added and subtracted to provide the chrominance signal and the index signal separate from each other, and the separated index signal is then employed to demodulate the chrominance signal and thereby provide color difference signals which, with the luminance signal separated from one of the reproduced composite signals, define a respective color picture.

37 Claims, 11 Drawing Figures

INVENTOR.
YASUHARU KUBOTA

INVENTOR.
YASUHARU KUBOTA

INVENTOR.
YASUHARU KUBOTA

INVENTOR.
YASUHARU KUBOTA

INVENTOR.
YASUHARU KUBOTA

INVENTOR.
YASUHARU KUBOTA

RECORDING AND REPRODUCING COLOR PICTURE INFORMATION

This invention relates generally to the recording and reproducing of color picture information, and more particularly is directed to improvements in the recording and reproducing of such information on a radiant energy-sensitive record medium, such as, monochrome photographic film.

Various arrangements or systems have been proposed for recording and reproducing color picture information on monochrome photographic film, for example, the system proposed by CBS Laboratories and identified by the tradename EVR, and which is disclosed in detail in U.S. Pat. No. 3,475,549. In such proposed system, the luminance information and the chrominance or color information with respect to each field of the color picture to be recorded and reproduced are recorded in separate or different areas of a respective frame or portion of the record medium. If the frame or portion of the record medium is made the same size as that normally employed for recording a monochrome picture, then the division of that frame area into two portions for respectively receiving the luminance information and the color information necessarily reduces the resolution of the recorded information. On the other hand, if each of the areas for receiving the separately recorded luminance information and chrominance information is made as large as the area normally employed for the recording of a monochrome picture, whereby to achieve similar resolution of the recorded information, then the amount of the record medium required for recording the color picture information is twice as great as the amount of the record medium required for recording monochrome pictures, and this results in an undesirably bulky or large reel of film.

In a modification of the so-called EVR system for recording and reproducing color picture information, for example, as specifically disclosed in U.S. Pat. No. 3,479,447, two adjacent frames of the monochrome photographic film are employed for recording the signals corresponding to each field of a color picture, with the luminance signal for one field being recorded in each of the two adjacent frames, and with two different color signals, that is, the I signal and the Q signal, corresponding to a single field of the color picture being superimposed on the luminance signal recorded in the two adjacent frames, respectively. This system also results in the use of an undesirably large amount of the record medium for the recording of color picture information, that is, in the use of twice as much record medium for the recording of color picture information as that ordinarily required for the recording of a corresponding period of monochrome or black and white pictures.

It has further been proposed, for example, as disclosed in U.S. Pat. No. 3,459,885, to provide a system for the recording and reproducing of color picture information on monochrome photographic film in which the chrominance information and the luminance information corresponding to a field of the color picture are recorded in superimposed relation in a single frame area of the monochrome photographic film, whereby to achieve the economical utilization of the film, that is, to use an area or frame of the film for each field of the color picture that is equivalent to the area or frame of the film that would be required for the recording of a monochrome picture. In the proposed system being here described, the chrominance information is used to modulate a color carrier, which may be suppressed, having a frequency distinct from the bandwidth occupied by the luminance information and, when the carrier is suppressed, a pilot or reference carrier is also recorded in each frame for use in recovering the original chrominance signals, with the pilot or reference having a frequency that is one-half the color carrier frequency so that, in reproducing the color picture information, the chrominance signal and the pilot or reference signal or carrier may be separately extracted from the reproduced composite signal by means of respective filters. Thereafter, during the reproducing operation of the system, the separated pilot or reference signal is multiplied so as to obtain the color carrier frequency which is used for demodulating the chrominance signal, whereby to obtain the original color difference signals therefrom. Further, in the previously proposed system, both the color side band information or chrominance signal and the pilot or reference carrier are recorded in reversed phase on successive frames in order to minimize the visibility of the respective recorded lines in the image to be eventually reproduced on a television receiver.

However, the system disclosed in U.S. Pat. No. 3,459,885, and described generally above is disadvantageous in that the use of a pilot or reference carrier having a frequency that is different from the color carrier frequency necessarily limits the band width that can be employed for the chrominance signal since, in the reproducing operation, the chrominance signal and the pilot or reference signal have to be separated from the reproduced composite signal by means of respective band-pass filters. Further, since the pilot or reference carrier and the chrominance signal are separated from the composite reproduced signal by respective filters, a difference in the delay time between these separated signals or carriers can occur. Similarly, the use of a multiplier for increasing the frequency of the reproduced pilot or reference signal up to the color carrier frequency provides another occasion for disturbing the phase or frequency of the signal which is eventually employed for demodulating the chrominance signal and obtaining the required color difference signals therefrom. Thus, the use of separate filters for obtaining the reproduced chrominance signal and pilot or reference signal and the use of a multiplier for increasing the frequency of the pilot or reference signal up to the color carrier frequency cause degradation of a color picture produced from the reproduced signal, and particularly adversely affect the white balance of such color picture.

Accordingly, it is an object of this invention to provide a method and apparatus for recording and reproducing color picture information on a radiant energy-sensitive record medium, for example, on monochrome photographic film, while avoiding the above described disadvantages of the arrangements and systems previously proposed for that purpose.

More specifically, it is an object of this invention to provide a method and apparatus for recording and reproducing color picture information, as aforesaid, while achieving excellent resolution of the color picture information and economical utilization of the record medium.

A further important object is to achieve the recording and reproducing of color picture information, as aforesaid, in a manner to attain excellent white balance of a color picture reproduced from the recorded information.

In accordance with an aspect of this invention, successive fields of color picture information are recorded by exposing successive frames or portions of the radiant energy-sensitive record medium, for example, a monochrome photographic film, to radiant energy in the form of light or a scanning electron beam, and modulating the radiant energy for recording, in each of the frames or record medium portions information representing a composite signal which contains luminance and chrominance signals and an index signal having the same frequency as the color carrier for the chrominance signal and with the phase of only one of the index and chrominance signals being reversed for successive color picture fields. In reproducing the recorded color picture information, the information recorded in the successive frames or record medium portions is detected to simultaneously reproduce first and second composite signals corresponding to two successive color picture fields, the chrominance and index signals are separated together from the first and second reproduced composite signals and added and subtracted to provide the chrominance signal and the index signal separate from each other, and the separated index signal is then employed to demodulate the chrominance signal and thereby provide the color difference signals which, with the luminance signal separated from one of the reproduced composite signals, define a respective color picture.

The above, and other objects, features and advantages of this invention, will be apparent from the following detailed description of illustrative embodiments, which is to be read in connection with the accompanying drawings, wherein.

Figures 1, 2, 3:
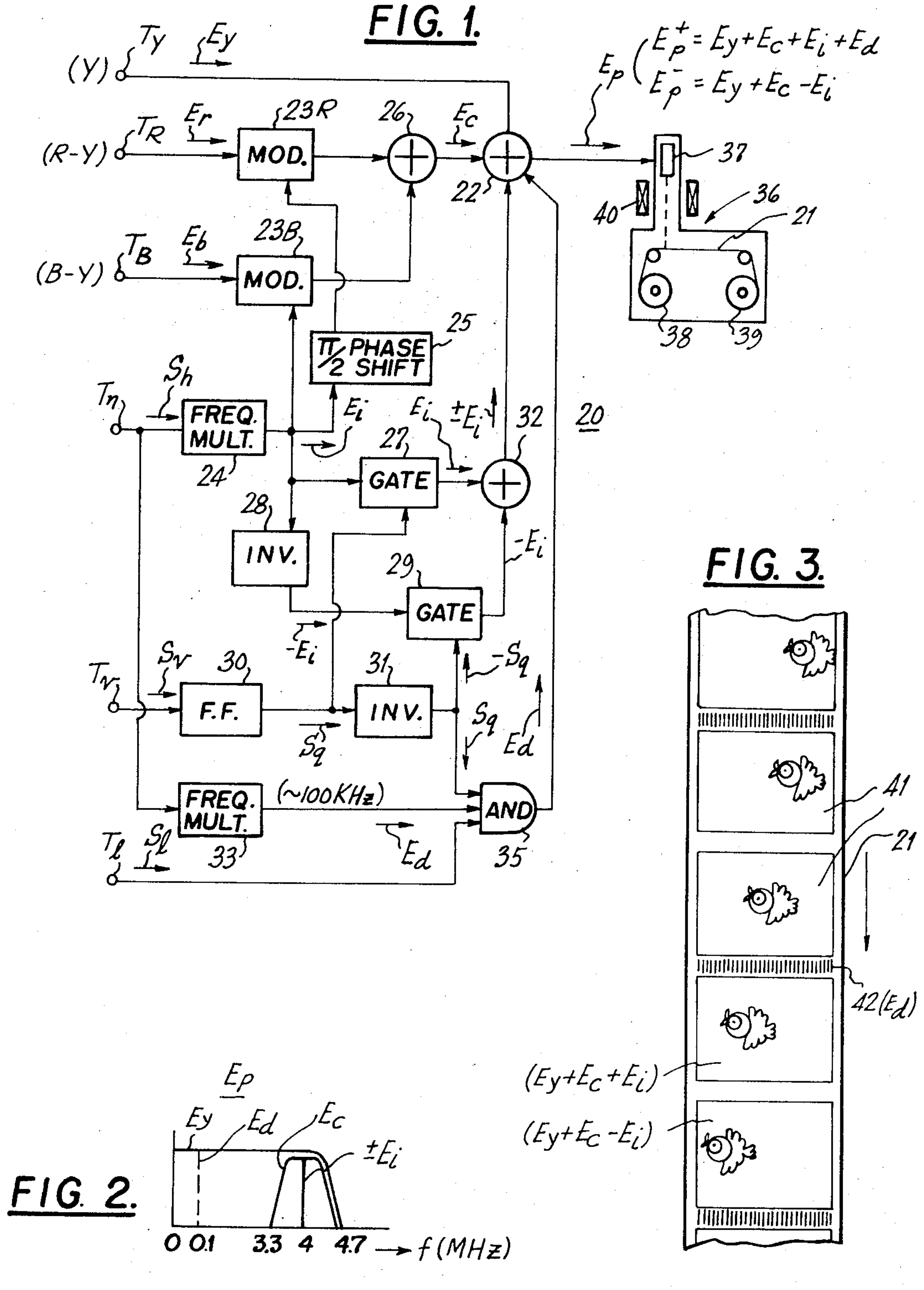
FIG. 1 is a schematic block circuit diagram showing an apparatus for recording color picture information in accordance with one embodiment of the present invention.
FIG. 2 is a graph of a typical spectrum showing the frequency composition of the several signals included in the composite signal which is recorded on a record medium in accordance with this invention.
FIG. 3 is a schematic illustration of a portion of a record medium as might be recorded with the apparatus of FIG. 1.

Referring to the drawings in detail, and initially to FIG. 1 thereof, it will be seen that the recording apparatus 20 according to this invention, as there shown, is intended to receive color video signals and to record information corresponding to each field of the color video signals in a respective portion or frame of a record medium 21 which is preferably a monochrome photographic film. The recording apparatus 20 is shown to have input terminals $T_y$, $T_r$ and $T_b$ which respectively receive the luminance signal $E_y$ and color difference signals $E_r$(R-Y) and $E_b$(B-Y) of the color video signals which are to be recorded. Recording apparatus 20 is further shown to have input terminals $T_h$, $T_v$ and $T_i$ for respectively receiving a horizontal synchronizing signal, a vertical synchronizing signal and a vertical blanking signal.

The luminance signal $E_y$, which also contains the horizontal synchronizing signal, is supplied directly from terminal $T_y$ to an adder circuit 22. The color difference signals $E_r$ and $E_b$ are supplied from terminals $T_r$ and $T_b$ to respective balanced modulators 23B and 23R. The horizontal synchronizing signal $S_h$ received at terminal $T_h$ is supplied therefrom to a frequency multiplier 24 which produces an index signal $E_i$ having a frequency that is from approximately 150 to 300 times greater than the horizontal scanning frequency of the color video signal, for example, the index signal $E_i$ may have a frequency of 4.0005 MHz. The index signal $E_i$ is supplied from frequency multiplier 24 directly to modulator 23R and through a 90° phase shifter 25 to the modulator 23B to serve as carrier signals which are modulated with the color difference signals $E_r$ and $E_b$. The balanced modulated signals from modulators 23R and 23B are combined in an adder circuit 26 to provide a chrominance signal or quadrature modulation signal $E_c$ which is also supplied to the adder circuit 22.

A portion of the index signal $E_i$ from frequency multiplier 24 is supplied directly to the input of a gate circuit 27 and to a phase inverter 28 which produces a reversed signal $-E_i$ supplied to the input of a gate circuit 29. The vertical synchronizing signal $S_v$ received at the terminal $T_v$ is supplied therefrom to a flip-flop circuit 30 which produces a control signal $S_q$ having its phase reversed in successive fields. The control signal $S_q$ is supplied directly to gate circuit 27 for controlling the latter, and is also supplied to a phase inverter 31 which produces an inverted control signal $-S_q$ supplied to gate circuit 29 for controlling the latter. Thus, gate circuits 27 and 29 are alternately opened and closed in successive fields for alternately passing the signals $E_i$ and $-E_i$, respectively, in successive fields, and such signals are combined in an adder circuit 32 to produce the field sequential index signal $\pm E_i$ having phase reversal in successive fields and which is supplied to adder circuit 22.

It is also preferable to provide a discrimination signal $E_d$ by which adjacent successive fields represented by the signals $+E_i$ and $-E_i$ can be discriminated from each other. In order to provide such discrimination signal, the recording apparatus 20 is further shown to comprise a frequency multiplier 33 which receives a portion of the horizontal synchronizing signal $S_h$ from terminal $T_h$, and by which the frequency of the horizontal synchronizing signal is multiplied by a factor of from about 4 to about 40, for example, to provide the discrimination signal $E_d$ with a frequency of about 100 $KH_z$. The signal $E_d$ derived from frequency multiplier 33, a portion of the inverted control signal $-S_q$ from inverter 31 and the vertical blanking signal $S_1$ applied to terminal $T_1$ are all supplied to an AND circuit 35 so that the discrimination signal $E_d$ will appear at the output of circuit 35 only during the simultaneous occurrence of the signals $-S_q$ and $S_1$, that is, only during the blanking period associated with every other field, for example, each odd-numbered field, of the color video signal. Such discrimination signal $E_d$ is supplied from the output of AND circuit 35 to adder circuit 22.

Accordingly, the adder circuit 22 produces a field sequential composite signal $E_p$ which, in each odd-numbered field of the color video signal, is constituted by a composite signal $E_p+$ made up of the luminance signal $E_y$, the chrominance signal $E_c$, the index signal $+E_i$ and the discrimination signal $E_d$, and which, in each even-numbered field of the color video signal, is constituted by a composite signal $E_p-$ made up of the luminance signal $E_y$, the chrominance signal $E_c$ and the index signal $-E_i$. Reference to FIG. 2 which shows the frequency spectrum of the field sequential composite signal $E_p$ will show that, in that composite signal, the index signal $\pm E_i$ has the same frequency as the color carrier of the chrominance signal $E_c$.

The field sequential composite signal $E_p$ is supplied from the output of adder circuit 22 to a so-called electron beam recorder 36 which may be of conventional design. The electron beam recorder 36 is shown generally to include an electron gun 37 for directing an electron beam against the film 21 as the latter is continuously advanced between takeup and supply reels 38 and 39 at a rate selected to expose a frame of the film to the action of the electron beam during each filed period of the color video signal to be recorded, and a deflection coil 40 by which the electron beam is made to scan the film 21 in the transverse direction. Further, the electron beam recorder 36 is adapted to vary the intensity of the electron beam, that is, the beam intensity is modulated, in accordance with the field sequential composite signal $E_p$ supplied to the electron beam recorder.

As shown schematically on FIG. 3, the composite signal $E_p+$ or $E_p-$ corresponding to a field of the color video signal is recorded within a respective frame of the monochrome photographic film 21. The index signal $\pm E_i$, having a frequency which is a multiple of the horizontal line scanning frequency, appears in each frame of the film as a series of transversely spaced longitudinally extending lines (not shown) with the phase of the pattern of lines representing the signal $\pm E_i$ being alternated in successive frames 41 of the film. It should be noted that the pattern of lines representing the index signal $\pm E_i$ does not interfere with the quality of the color picture that may be reproduced from the film 21 for the reasons hereinafter described in detail. Further, the discrimination signal $E_d$, which is the output of frequency multiplier 33, is recorded on film 21 before every other frame, for example, before each odd-numbered frame on the film, as indicated at 42 on FIG. 3. After exposure in the electron beam recorder 36, the monochrome picture film 21 is suitably developed so as to permanently retain a recording of the color video signals or other color picture information supplied to the recording apparatus 20.

Figure 4:
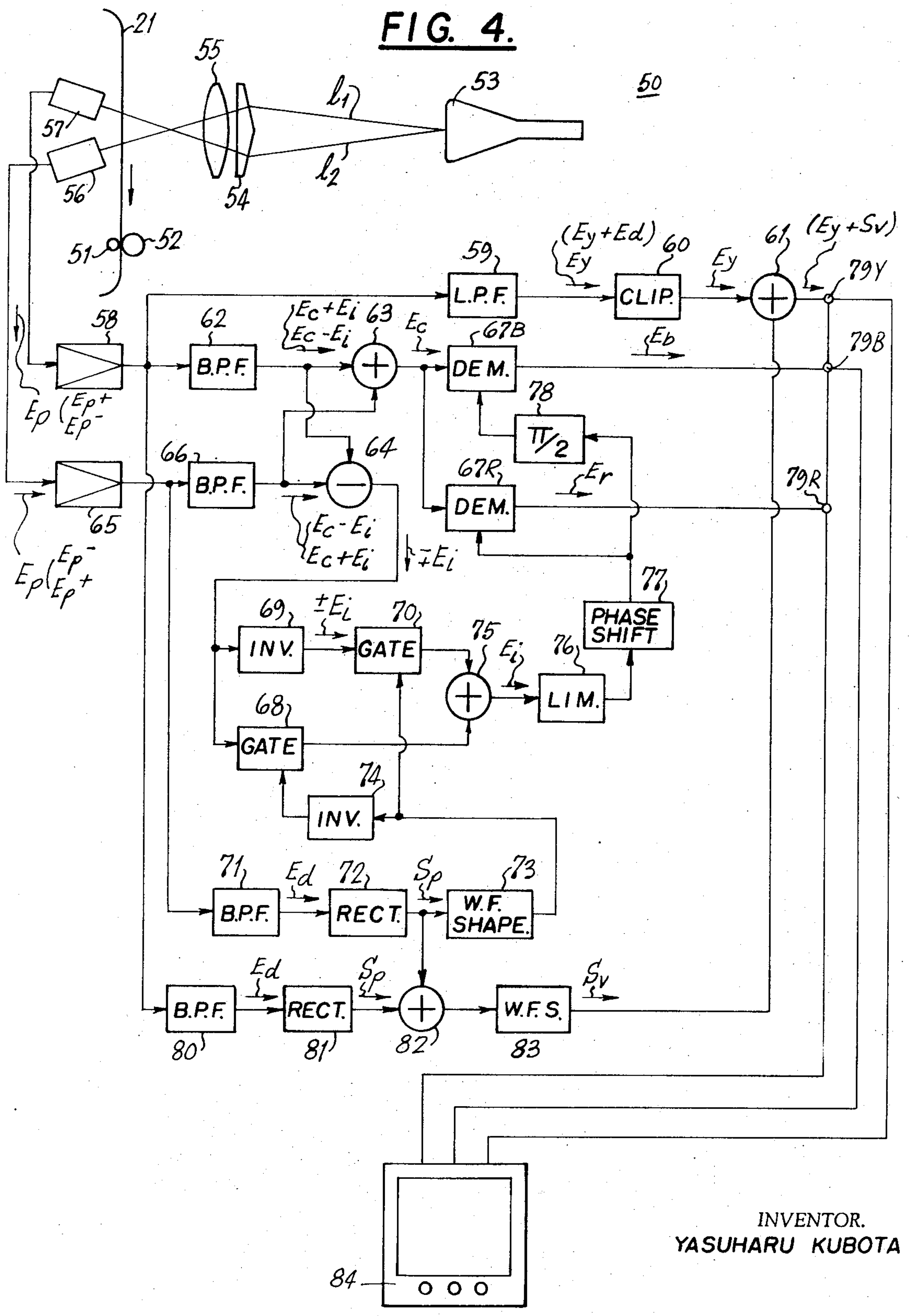
FIG. 4 is a schematic block circuit diagram of a reproducing apparatus in accordance with an embodiment of this invention that can be used for reproducing color picture information recorded on a record medium with the recording apparatus of FIG. 1.

In order to reproduce the original luminance signal $E_y$ and the original color difference signals $E_r$ and $E_b$ contained in the color video signals supplied to the recording apparatus 20, the film 21 having the field sequential composite signal $E_p$ recorded thereon is played back in a reproducing apparatus, for example, in a reproducing apparatus 50 as illustrated on FIG. 4. In such reproducing apparatus, the composite signals recorded in two adjacent frames 41 of the film 21 are simultaneously reproduced to obtain reproduced composite signals $E_p+$ and $E_p-$ from which the chrominance and index signals $(E_c + E_i)$ and $(E_c - E_i)$ are respectively separated, as by filters, whereupon the separated signals $(E_c + E_i)$ and $(E_c - E_i)$ are added and subtracted for separately obtaining the chrominance signal $E_c$ and the index signal $E_i$, and the separated index signal $E_i$ is employed to demodulate the separated chrominance signal $E_c$ for obtaining the color difference signals $E_r$ and $E_b$.

As shown more particularly on FIG. 4, in the reproducing apparatus 50, the recorded film 21 is continuously advanced, as by a rotated capstan 51 and cooperating pinch roller 52, past a reproducing station at which two light beams $\mathbf{1_1}$ and $\mathbf{1_2}$ from a flying light-spot scanner 53 are focused on the film through a prism 54 and a lens 35 so as to impinge on the film at locations that are spaced apart along the length of the film by one frame distance. The radiant energies of beams $\mathbf{1_1}$ and $\mathbf{1_2}$ transmitted through film 21 are received by photoelectric transducers, for example, photomultiplier tubes 56 and 57, respectively. It will be apparent that the outputs of tubes 56 and 57 correspond to the composite signals $E_p+$ and $E_p-$, or the composite signals $E_p-$ and $E_p+$, recorded in two adjacent frames of film 21.

In the arrangement shown on FIG. 4, it is assumed that the light beams $\mathbf{1_1}$ and $\mathbf{1_2}$ from the scanner 53 scan film 21 only in the horizontal or transverse direction, and that the vertical scanning of the frames of film 21 is achieved by the continuous advancement of the film. However, it is preferable to employ a flying spot CRT as the scanner 53 in which the beams issuing therefrom are made to scan vertically as well as horizontally, whereby to achieve scanning of each frame of film 21 in 1/60 of a second in order to avoid burning of the phosphor green.

In any case, it will be apparent that, while the signal $E_p-$ is being reproduced by the transducer or tube 56, the composite signal $E_p+$ which lags by one field is being reproduced by the transducer or tube 57 or, conversely, while the composite signal $E_p+$ is being reproduced by the transducer 56, the composite signal $E_p-$ which lags by one field is being reproduced by the transducer 57.

The reproduced composite signal $E_p+$ or $E_p-$ is supplied from transducer 57 through an amplifier 58 to a low-pass filter 59 which separates therefrom a field sequential signal ($E_y + E_d$) and $E_y$, that is, the luminance signal $E_y$ with the discrimination signal $E_d$ being included in the vertical blanking period of every other field. The field sequential signal contained at the output of filter 59 is passed through a clipper 60 for removing the discrimination signal $E_d$ therefrom, and the resulting luminance signal $E_y$ is then supplied to an adder circuit 61.

The reproduced composite signal from transducer 57, as amplified by amplifier 58, is further supplied to a bandpass filter 62 for separating therefrom the composite and index signals, that is, a field sequential signal composed of the composite and index signals ($E_c + E_i$) and the composite and index signals ($E_c - E_i$) in alternating fields. The described field sequential signal obtained from filter 62 is supplied to an adder circuit 63 and a subtracting circuit 64. At the same time, the reproduced composite signal $E_p-$ or $E_p+$ from transducer 56, which precedes by one field the composite signal reproduced by transducer 57, is supplied through an amplifier 65 to a band-pass filter 66 which separates the chrominance and index signals from the respective reproduced composite signal, whereby to provide a field sequential signal ($E_c - E_i$) and ($E_c + E_i$) which is supplied to adder circuit 63 and subtracting circuit 64. Thus, adder circuit 63 provides the chrominance signal $E_c$ at its output, and such signal is supplied to demodulators 67R and 67B, while the subtracting circuit 64 provides a field sequential index signal $\mp E_i$, that is, the separated index signal with its phase being reversed in successive fields.

In order to convert the field sequential signal $\mp E_i$ into an index signal $E_i$ of constant phase which exactly corresponds to the color subcarrier of the chrominance signal $E_c$, and hence can be used for synchronously detecting color difference signals in the demodulators 67R and 67B, the field sequential signal $\mp E_i$ from subtracting circuit 64 is supplied to a gate circuit 68 and also to a phase inverter 69 which reverses the polarity of the signal $\mp E_i$ and thus provides a signal $\pm E_i$ which is supplied to a gate circuit 70. For control of the gate circuits 68 and 70, the output of amplifier 65 is supplied to a band-pass filter 71 which separates therefrom the discrimination signal $E_d$ appearing in the vertical blanking period of the odd-numbered fields. The separated discrimination signal $E_d$ is supplied to a rectifier 72 which provides a pulse signal $S_p$ which also appears only in the vertical blanking period of the odd-numbered fields, and this pulse signal $S_p$ is supplied to a wave form shaper 73 to produce a control signal which alternates by field in synchronism with the discrimination signal $E_d$. Such control signal from the shaper 73 is supplied directly to gate circuit 70 and through a phase inverter 74 to gate circuit 68 so that gate circuits 68 and 70 are opened during alternate fields, respectively, to each pass the index signal $+ E_i$. The outputs of gates circuits 68 and 70 are supplied to an adder circuit 75 to provide the continuous index signal $E_i$ which is passed through a limiter 76 and a phase shifter 77 for adjusting the phase of the index signal before being applied to the demodulator 67R. The output of phase shifter 77 is further supplied to the demodulator 67B through a phase shifter 78 which further shifts the phase of the index signal by 90°. Thus, the demodulators 67R and 67B are operative to demodulate the chrominance signal $E_c$, that is, to synchronously detect or provide the color difference signals $E_r(R - Y)$ and $E_b(B - Y)$ which are supplied to respective output terminals 79R and 79B.

A portion of the output of amplifier 58 is also supplied to a band-pass filter 80 which separates the discrimination signal $E_d$ therefrom, and the thus separated discrimination signal $E_d$ is then supplied to a rectifier 81 which produces a pulse signal $S_p'$. The pulse signals $S_p$ and $S_p'$ from rectifiers 72 and 81, respectively, are both supplied to an adder circuit 82. Since the pulse signal $S_p$ from rectifier 72 occurs during the vertical blanking period preceding the scanning of an odd-numbered frame of the film 21 by the light beam $1_1$, and since the pulse signal $S_p'$ from rectifier 81 occurs during the vertical blanking period preceding the scanning of an odd-numbered frame of the film by the light beam $1_2$, it will be apparent that the pulse signals $S_p$ and $S_p'$ from rectifiers 72 and 81 occur alternately during the vertical blanking periods preceding the successive fields. Therefore, the output of adder circuit 82 is constituted by a pulse signal occurring during the vertical blanking period preceding each field, and such output is supplied to a wave form shaper 83 to produce the vertical synchronizing signal $S_v$ which is supplied to the adder circuit 61. Hence, the output of adder circuit 61 is constituted by the luminance signal $E_y$ and the vertical synchronizing $S_v$ and is supplied to a respective output terminal 79Y. Such signal supplied to output terminal 79Y, and the color difference signals supplied to the output terminals 79B and 79R may be conventionally employed to operate a monitor or color television receiver 84 for producing a color picture corresponding to the color picture information recorded on the monochrome photographic film 21.

It will be noted that, when color picture information is recorded and reproduced in accordance with this invention, as described above, all of the information for each field of the color picture is recorded in the entire area of a single respective frame of the monochrome photographic film 21 so as to ensure economical utilization of such film. Since the recorded chrominance and index signals are in the same band, the band widths of the luminance signal and the chrominance signal, and particularly of the latter, can be widened to provide a reproduced color picture having high resolution. Further, during reproduction, the chrominance and index signals are derived from a common amplifier and filter, for example, from the amplifier 58 and filter 62 or from the amplifier 65 and filter 66, so that no difference in the delay time between the signals can be produced and, accordingly, a color picture of excellent white balance is obtained. It is also to be noted that, during reproduction, the index signal used to demodulate the chrominance signal $E_c$ by synchronous detection is continuously reproduced so that the phases of the chrominance and index signals are continuously coincident with each other, even though there may be some deviation in the scanning paths of the electron beam during recording or of the light beams during reproducing, whereby to ensure the reproduction of color pictures with high fidelity.

Since the index signal $\pm E_i$ is recorded in each frame of film 21 in the form of a series of transversely spaced longitudinal lines, the phase of the reproduced index signal $\pm E_i$ will not change relative to the phase of the carrier of chrominance signal $E_c$ even if there is some variation or deviation in the vertical scanning rate during reproduction, for example, by reason of a variation in the rate of advancement of film 21. Thus, demodulation of the chrominance signal with the correct phase is ensured. Since the signal $\pm E_i$ recorded on the film is given a high frequency, particularly, the same frequency as the carrier of chrominance signal $E_c$, such index signal $\pm E_i$ will not appear in the reproduced color picture. Even if the index signal $\pm E_i$ is reproduced on the screen of the monitor or color television receiver 84, the phases of the resulting images will be alternated in successive fields and hence will cancel each other by reason of the after-image effect so that such images will not be observable.

Figure 5:
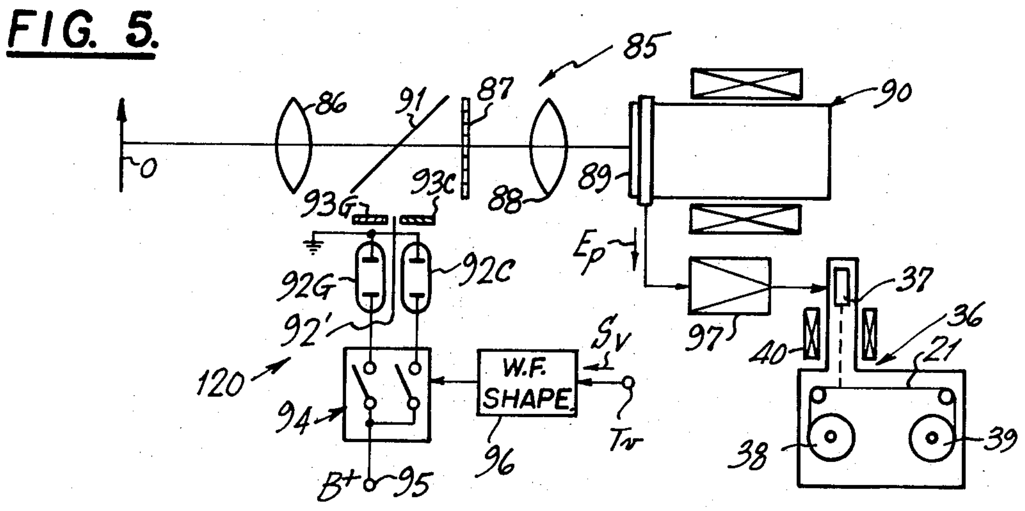
FIG. 5 is a schematic view of a recording apparatus in accordance with another embodiment of this invention.

Referring now to FIG. 5, it will be seen that a recording apparatus 120 in accordance with another embodiment of this invention may include a color television camera 85 of a type that is disclosed in detail in my copending allowed U.S. patent application Ser. No. 82,460, filed October 20, 1970, and having a common assignee herewith. As shown schematically on FIG. 5, the color television camera 85 may comprise an object lens 86 by which an image of an object 0 in the field of view of the camera is focused on the plane of a color filter 87. A relay lens 88 is provided for projecting an image of the color filter 87 onto a photoelectric conversion layer 89 of an image pickup tube 90 which may be a vidicon of the type that is generally employed for producing a black-and-white television signal. In the event that the color filter 87 is made a part of the face plate assembly of image pickup tube 90 so as to be adjacent the photoelectric conversion layer 89, the relay lens 88 may be eliminated.

Figures 6, 7:
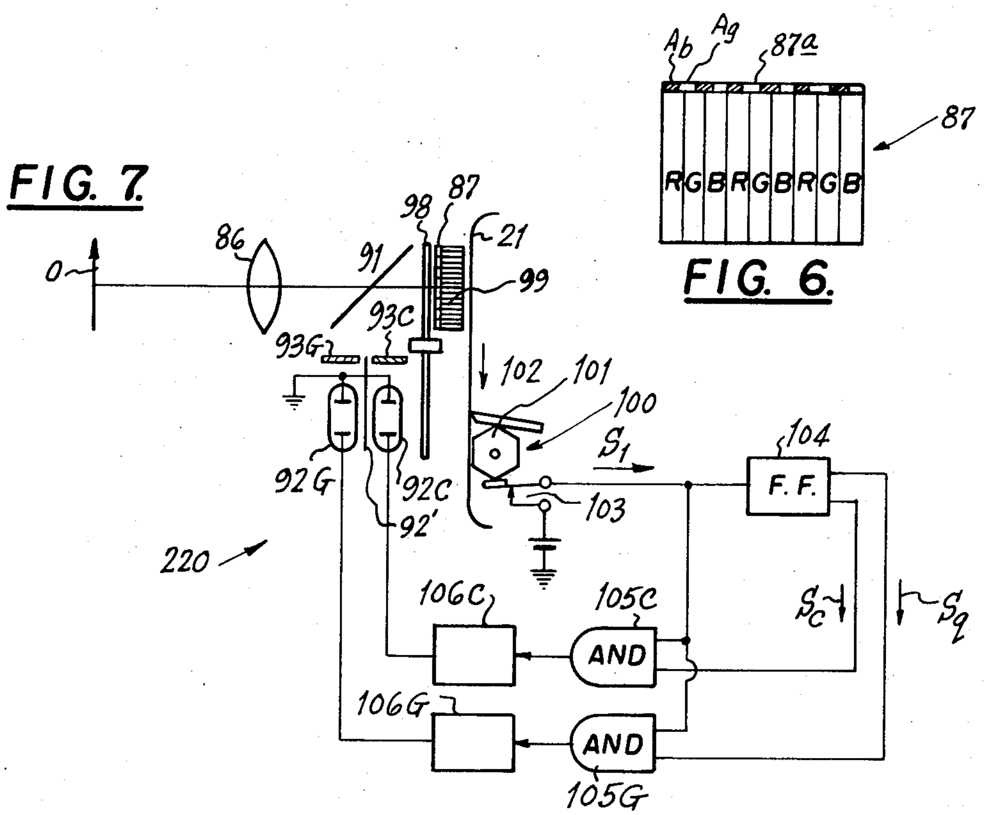
FIG. 6 is a plan view of a color filter included in the apparatus of FIG. 5.
FIGS. 7 and 8 are schematic views showing recording apparatus in accordance with two additional embodiments of this invention.

As shown on FIG. 6, the color filter 87 may be composed of triads of stripe-like color filter elements R, G and B which respectively transmit red, green and blue light and which are arranged in a repeating cyclic order with the longitudinal directions of the stripe-like color filter elements extending vertically, that is, at right angles to the horizontal line scanning direction of the electron beam in image pickup tube 90. The color filter 87 is further shown to include a peripheral portion 87a, for example, at the top of the color filter, so as to be projected onto a portion of the photoelectric conversion layer 89 which is scanned by the electron beam of tube 90 during a vertical blanking period. Such peripheral portion 87a of color filter 87 is composed of alternately arranged filter elements $A_b$ and $A_g$ which are respectively opaque or black and capable of transmitting one of the primary colors, for example, capable of transmitting green light.

A semi-reflecting or half-mirror 91 is interposed between object lens 86 and color filter 87 and is arranged at 45° to the optical axis for projecting light of alternately complementary colors through color filter 87 so as to form on the layer or scanning surface 89 of tube 90 an index image in overlapping relation with the color separated image of the object 0 which is provided on layer 89 by means of color filter 87 and lenses 86 and 88. The light of alternately complementary colors is provided by light sources 92G and 92C, for example, xenon lamps having brief lighting periods, and which are alternately energized to direct light through respective filters 93G and 93C for reflection by half-mirror 91 toward color filter 87. The filters 93G and 93C respectively transmit green light and cyan light, that is, light of a color that is complementary to green light. The light sources 92G and 92C are suitably shielded from each other, as indicated schematically at 92; so that green and cyan light will be transmitted through the respective color filters 93G and 93C only when the respective lamps 92G and 92C are energized.

In order to effect the alternate energization of lamps 92G and 92C, an electron switching circuit 94 is interposed between such lamps and a terminal 95 connected with a suitable source of electric power. A vertical synchronizing signal $S_v$ is applied to an input terminal $T_v$ and supplied therefrom to a wave form shaper 96 to provide a control signal for the switching circuit 94 so that the lamps 92G and 92C will be alternately energized during the vertical blanking periods preceding the successive fields.

When lamp 92G is energized, for example, during the vertical blanking period before each of the odd-numbered fields, the resulting green light reflected by half-mirror 91 passes only through the green filter elements G of color filter 87 and a corresponding pattern is projected on the photoelectric conversion layer 89 to provide a corresponding pattern of electric charges which are stored in such layer. When the photoelectric conversion layer 89 is scanned during each of the odd-numbered fields, the electrical output from tube 90 includes a luminance signal $E_y$ and a chrominance signal $E_c$ in correspondence to the color separated image of the object projected on the layer 89, as mentioned above, and the electrical output from the tube further includes the index signal $+E_i$ which is obtained from the electric charges stored on layer 89 as a result of the index image projected by reason of the energization of lamp 92G. Further, as a result of energization of lamp 92G during the vertical blanking period preceding each odd-numbered field, the resulting green light passes through the green filter elements $A_g$ of the peripheral portion 87a of color filter 87 and thereby provides a corresponding light pattern, and a resultant pattern of electrical charges, on the peripheral portion of layer 89 which is scanned during the vertical blanking period preceding each odd-numbered field. Thus, the output from tube 90 for each odd-numbered field further includes a discrimination signal $E_d$ which results from the scanning of the stored electrical charges on the peripheral portion of layer 89 during the vertical blanking period. Accordingly, the electrical output of tube 90, during each odd-numbered field, is the composite signal $E_p+ = (E_y + E_c + E_i + E_v)$.

During the vertical blanking period preceding each even-numbered field, the energization of lamp 92C causes cyan light to be reflected by half-mirror 91 onto color filter 87, and the image of color filter 87, as illuminated by the cyan light, is projected onto the photoelectric conversion layer 89 to provide a pattern of electrical charges on the latter, which pattern is complementary to the pattern of electrical charges formed when the color filter 87 is illuminated by green light. Accordingly, when the layer 89 is scanned during each even-numbered field, the luminance signal $E_y$ and the chrominance $E_c$ are obtained, as before, along with an index signal $-E_i$ having its phase reversed with respect to the phase of the signal $+E_i$ obtained during the odd-numbered fields. Since the cyan light is not transmitted through any of the elements of the peripheral portion 87*a* of the color filter, no discrimination signal is obtained during the vertical blanking period preceding each even-numbered field. Thus, for each even-numbered field, the electrical output from image pickup tube 90 constitutes a composite signal $E_p- = (E_y + E_c - E_i)$.

As shown on FIG. 5, the field sequential signal $E_p$ constituted alternately by the composite signal $E_p+$ and the composite signal $E_p-$, is supplied from image pickup tube 90 through an amplifier 97 to the electron beam recorder 36 for recording on the monochrome photographic film 21 in the same manner as has been described with respect to the recording apparatus 20 of FIG. 1. After such recording of the film 21 and development of the latter, the color picture information recorded thereon may be reproduced in a reproducing apparatus similar to that shown on FIG. 4, but in which the demodulators 67B and 67R and an additional synchronous detector or demodulator are suitably controlled to detect the respective three-color or dot sequential signals that make up the chrominance signal $E_c$.

Referring now to FIG. 7, it will be seen that, in a recording apparatus 220 in accordance with another embodiment of this invention, color picture information or color video signals corresponding to an object 0 in the field of view of the recording apparatus may be directly recorded on the monochrome photographic film 21. In FIG. 7, the various parts of recording apparatus 220 that are similar to parts of the recording apparatus 120 described above with reference to FIG. 5 are identified by the same reference numerals. Thus, it will be seen that the recording apparatus 220 includes an object lens 86 for forming, at the plane of the color filter 87, an image of the object 0 in the field of view of the apparatus, and lamps 92G and 92C having filters 93G and 93C, respectively, associated therewith and which are alternately energized to provide green and cyan light, respectively, reflected by the half-mirror 91 through a rotary shutter 98 onto color filter 87. The resulting color separated image of object 0 and the index image which alternates its phase in successive field periods are projected or transmitted in overlapping relation onto film 21 by way of an optical fiber plate 99. The film 21 having the usual perforations along its side portions is advanced intermittently by a conventional mechanism 100 which, as shown schematically on FIG. 7, may include a rotated cam 101 actuating a pawl 102 which engages the perforations of the film and thereby intermittently advances the latter through a distance equal to the frame distance on the film. Further, the rotation of cam 101 is controlled so that the frequency of the intermittent advancement of film 21 is equal to the field frequency of the color video signal which is to be recorded. The rotary shutter 98 is actuated in synchronism with the film advancement mechanism 100 so that the shutter 98 is opened during each period that the film 21 is at rest with a frame of the film in registration with optical fiber plate 99. Thus, when a frame of film 21 is at rest in registration with plate 99 which defines a recording station, the opening of rotary shutter 98 permits the exposing of the frame of film with the color separated image which corresponds to the luminance signal and the chrominance signal of a color video signal. In order to further expose each frame of film 21 with an index image corresponding to an index signal $\pm E_i$ having phase reversal in successive fields, the cam 101 further actuates a switch 103 to produce a pulse signal $S_1$ for each frame of the film, and the pulse signal $S_1$ is supplied to a flip-flop circuit 104 which provides pulse signals $S_g$ and $S_c$ for alternate frames of the film. Signals $S_1$ and $S_g$ are both supplied to an AND circuit 105G and signals $S_1$ and $S_c$ are both supplied to an AND circuit 105C. The AND circuits 105G and 105C are connected, at their respective outputs, with light source operating circuits 106G and 106C which are operative to energize lamps 92G and 92C, respectively. It will be apparent that, when signals $S_1$ and $S_g$ occur simultaneously, for example, in response to the presence of an odd-numbered frame of film 21 at the recording station, AND circuit 105G passes a signal to operate circuit 106G and thereby cause energization of lamp 92G. Conversely, for example, during the presence of an even-numbered frame of the film at the recording station, the simultaneous occurrence of pulse signals $S_1$ and $S_c$ causes the circuit 105C to pass a signal for operating circuit 106C and thereby causing energization of lamp 92C. Thus, the lamps 92G and 92C are energized during the presence and exposure of alternate frames of the film at the recording station to provide the index images projected on the respective frames of the film in a manner described above with respect to the embodiment of FIG. 5. Further, since the color filter 87 has the peripheral portion 87*a* described above with reference to FIG. 6, the recording apparatus 220 further provides an image corresponding to the discrimination signal $E_d$ on the film adjacent each odd-numbered frame thereof. The alternate energization of lamps 92G and 92C in the recording apparatus 220 may occur at any time during the periods when the rotary shutter 98 is in its open condition.

After the film 21 has had its successive frames exposed at the recording station of recording apparatus 220 and the film has been developed, the color picture information thus recorded on the film 21 can be reproduced in the reproducing apparatus described above for use with the recording apparatus of FIG. 5.

Although the reproducing apparatus 120 of FIG. 5 and the reproducing apparatus 220 of FIG. 7 have been described as including a color filter 87 in which the stripe-like color filter elements R, G and B respectively transmit red, green and blue light, it is to be noted that each color filter element B of filter 87 may be replaced by a similarly positioned color filter element which is operative to transmit cyan light.

In each recording apparatus according to this invention, as previously described herein, the chrominance signal $E_c$ is recorded with the phase of its carrier unchanged in successive fields, while the index signal is recorded as a field sequential signal $\pm E_i$, that is, with its phase reversed or alternated in successive fields. However, in accordance with this invention, the chrominance signal may be recorded as a field sequential signal $\pm E_c$, that is, with the phase of its carrier alternated or reversed in successive fields, while the index signal $E_i$ is recorded with constant phase, that is, with its phase unchanged in successive fields. In the latter case, the field sequential composite signal $E_p$ which is recorded and reproduced is made up of the composite signal $E_p+ =(E_y + E_c + E_i + E_d)$ and the composite signal $E_p- = (E_y - E_c + E_i)$.

For example, as shown on FIG. 8, a recording apparatus 320 according to this invention which operates in accordance with the above described scheme, that is, which records the chrominance signal with its phase being reversed in successive fields and which records the index signal with its phase being constant in successive fields, may be generally similar to the recording apparatus 20 described with reference to FIG. 1. Further, it will be seen that the various parts of recording apparatus 320 which correspond to parts included in the recording apparatus 20 on FIG. 1 are identified by the same reference numerals.

Thus, recording apparatus 320 includes an adder circuit 22 to which the luminance signal $E_y$ is supplied h from the input terminal $T_y$, and a frequency multiplier 24 which receives the horizontal or line synchronizing signal $S_h$ from terminal $T_d$ and which produces the index signal $E_i$ supplied directly to the adder circuit 22. Further, the color difference signals $E_r$ and $E_b$ received at input terminals $T_r$ and $T_b$ are supplied to respective modulators 23R and 23B in which such color difference signals respectively modulate a carrier constituted by the index signal $E_i$ having its phase shifted by 90° in the phase shifter 25 and a carrier represented by the index signal as directly received from the frequency multiplier 24. The outputs of modulators 23R and 23B are combined in an adder circuit 26 to provide the chrominance signal $E_c$ which is supplied directly to one input of an electronic switching circuit 107 and also supplied to a phase inverter 108 which produces the signal $- E_c$ supplied to another input of switching circuit 107. The vertical field synchronizing signal $S_v$ received at input terminal $T_v$ is supplied to the flip-flop circuit 30 which produces the control signal $S_q$ supplied to switching circuit 107 so as to cause the latter to alternately pass the chrominance signal $E_c$ and the inverted chrominance signal $-E_c$ in successive fields and thereby provide the field sequential chrominance signal $\pm E_c$ which is supplied to adder circuit 22.

The horizontal line synchronizing signal $S_h$ is also supplied from terminal $T_h$ to the frequency multiplier 33 which produces the discrimination signal $E_d$ supplied to the AND circuit 35 along with the signal $S_q$ and the vertical blanking period signal $S_1$ so that the discrimination signal $E_d$ is passed through circuit 35 to adder circuit 22 only during the vertical blanking period preceding each odd-numbered field. As in the embodiment of FIG. 1, the field sequential composite signal $E_p$ is supplied from the output of adder circuit 22 of the electron beam recorder 36 for recording on the monochrome photographic film 21.

When color picture information is recorded on film 21 by means of the recording apparatus 320 of FIG. 8, such color picture information can be reproduced by means of the reproducing apparatus 350 shown on FIG. 9 where the various parts of the reproducing apparatus which correspond to parts of the apparatus 50 described with reference to FIG. 4 are identified by the same reference numerals. In the reproducing apparatus 350, two adjacent frames of the continuously advanced recorded film 21 are simultaneously scanned by the light beams $l_1$ and $l_2$ so that the respective transducers 56 and 57 reproduce the corresponding composite signals $E_p+$ and $E_p-$, or the composite signals $E_p-$ and $E_p+$. The composite signal reproduced by transducer 57 is supplied through amplifier 58 to low pass filter 59 to separate the luminance signal $E_y$ and the discrimination signal $E_d$, if any, therefrom, and the output of filter 59 is passed through clipper circuit 60 for removal of the discrimination signal $E_d$ prior to being supplied to the adder circuit 61.

The reproduced composite signal from transducer 57, as amplified by amplifier 58, is further supplied to band-pass filter 62 which separates therefrom the field sequential signal composed of the composite and index signals $(E_c + E_i)$ and the composite and index signals $(-E_c + E_i)$ in alternating fields. The field sequential signal obtained from filter 62 is supplied to the adder circuit 63 and the subtracting circuit 64. At the same time, the composite signal reproduced by transducer 56 which precedes by one field the composite signal reproduced by transducer 57 is supplied through amplifier 65 to band-pass filter 56 which separates therefrom the field sequential signal $(-E_c + E_i)$ and $(E_c + E_i)$, and the latter field sequential signal is also supplied to adder circuit 63 and subtracting circuit 64. Thus, in the reproducing apparatus 350, the adder circuit 63 provides the index signal $E_i$ having constant phase in the successive fields, while the subtracting circuit 64 provides a field sequential chrominance signal $\mp E_c$, that is, the chrominance signal with its phase being reversed in successive fields. The index signal $E_i$ of constant phase is supplied from adder circuit 63 through limiter 76 and phase shifting circuit 77 to demodulator 67R and further through 90° phase shifter 78 to demodulator 67B. The field sequential chrominance signal $\mp E_c$ is supplied directly from subtracting circuit 64 to one input of an electronic switching circuit 108 and further to an inverter 69 which produces a field sequential chrominance signal $\pm E_c$ supplied to another input of switching circuit 108. The switching circuit 108 is controlled, as hereinafter described, so as to alternately select one or the other of the two input signals in successive fields, and thereby provide the chrominance signal $E_c$ of the constant phase which is supplied to the demodulators 67R and 67B in which the color difference signals $E_r$ and $E_b$ are synchronously detected, with the resulting color difference signals being supplied to the output terminals 79R and 79B.

In order to control the switching circuit 108, as described above, the output of amplifier 65 is further supplied to the band-pass filter 71 for separating the discrimination signal $E_d$ which is then supplied to the rectifier 72 providing the pulse signal $S_p$ which appears only in the vertical blanking period of the odd-numbered fields. Pulse signal $S_p$ is supplied to the wave form shaper 73 to produce the control signal which alternates by field in synchronism with the discrimination signal $E_d$ and which is applied to switching circuit 108 for controlling the latter.

As in the reproducing apparatus 50 of FIG. 4, the apparatus 350 further applies a portion of the output of amplifier 58 to the band-pass filter 80 for separating the discrimination signal $E_d$ therefrom, and such discrimination signal is applied to the rectifier 81 for producing the pulse signal $S_p'$ which is supplied to the adder circuit 82 along with the pulse signal $S_p$ from rectifier 72. Since the pulse signals $S_p$ and $S_p'$ occur alternately during the vertical blanking periods preceding the successive fields, the output of adder circuit 82 is constituted by a pulse signal occurring during the vertical blanking period preceding each field, and such output is supplied to the wave form shaper 83 to produce the vertical synchronizing signal $S_v$ which is supplied to the adder circuit 61. Hence, the output of adder circuit 61 supplied to output terminal 79Y is constituted by the luminance signal $E_y$ and the vertical synchronizing signal $S_v$. As in the embodiment of FIG. 4, the signals provided at the output terminal 79Y, 79R and 79B of reproducing apparatus 350 may be applied to a monitor or color television receiver to there provide a color picture corresponding to the reproduced signals.

Figures 8, 11:
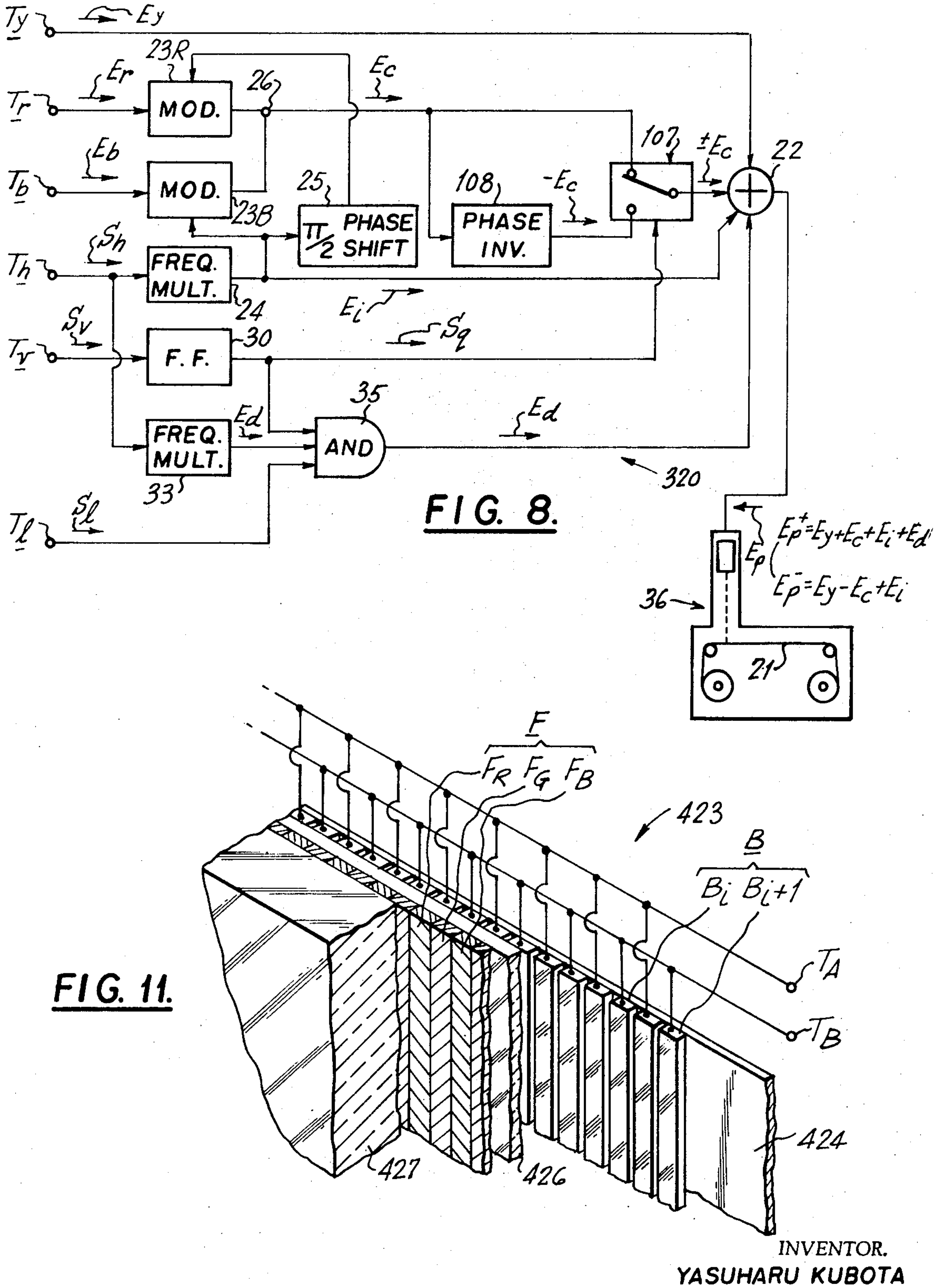
FIG. 11 is a schematic, enlarged, fragmentary perspective view of a portion of an image pickup tube included in the apparatus of FIG. 10.
Figure 9:
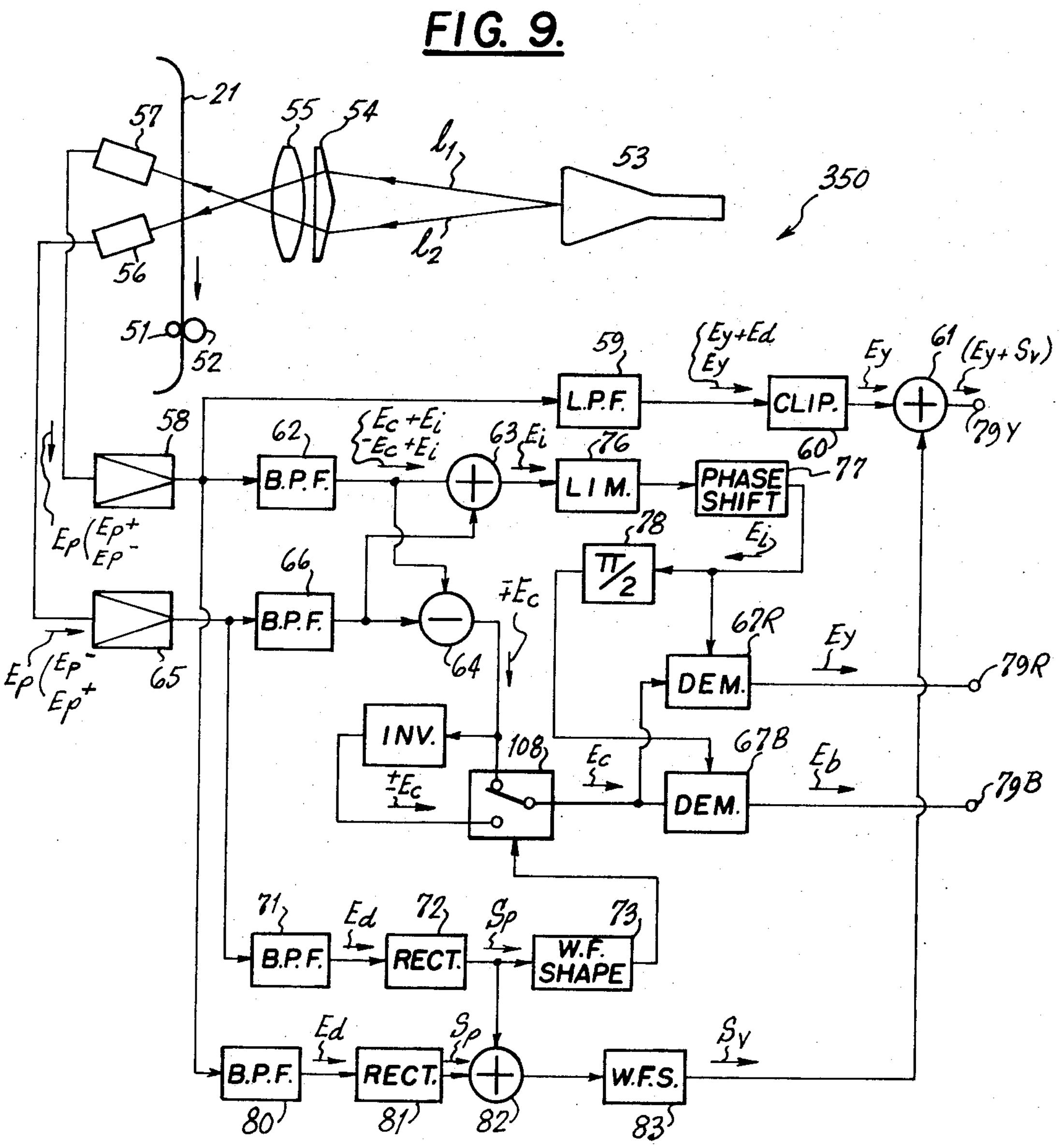
FIG. 9 is a schematic view showing a reproducing apparatus in accordance with this invention which may be employed for reproducing signals recorded by the apparatus of FIG. 8.

It should be noted that the recording apparatus and reproducing apparatus according to the embodiments of this invention shown on FIGS. 8 and 9, that is, in which the index signal is recorded with constant phase while the carrier of the chrominance signal has its phase reversed in successive fields, have all of the advantages which have been referred to above in connection with the embodiments of the invention shown on FIGS. 1 and 4.

If the center frequency of the chrominance signal $E_c$ included in the recorded composite signal $E_p$ is selected to be 3.58 $MH_z$, then the NTSC color television signal can be obtained from the luminance signal and the chrominance signal reproduced with the apparatus of FIG. 4 or FIG. 9. During such reproduction, the reproduced index signal $E_i$ may be compared, as to its phase, with an external index signal and a control signal produced corresponding to any detected phase difference for controlling the horizontal scanning speed of the flying-spot CRT 53 and thereby maintaining a constant phase of the reproduced index signal. With the phase of the reproduced index signal $E_i$ maintained constant in relation to a standard or external index signal, the reproduced image or color picture is provided with high-fidelity color.

Figure 10:
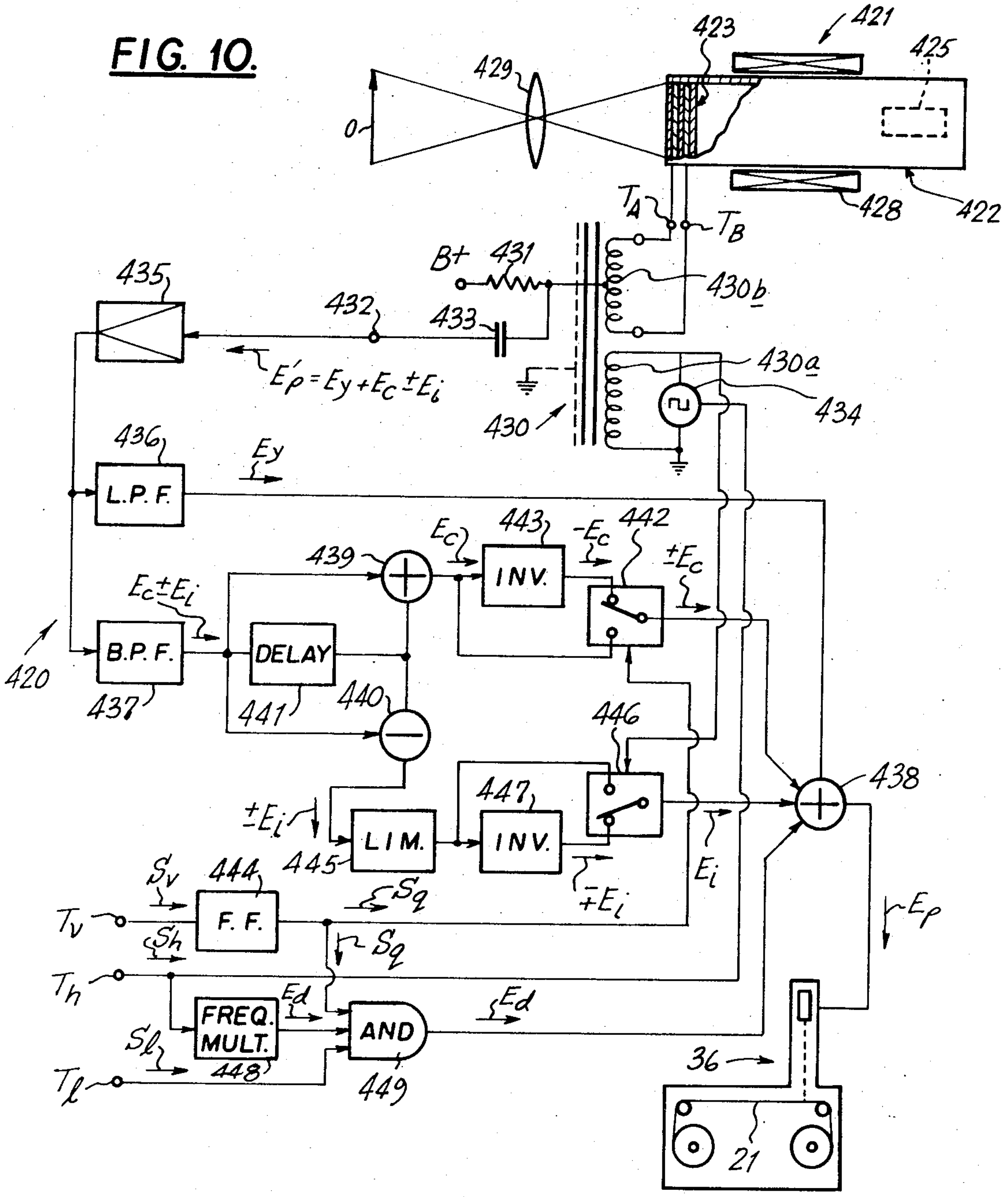
FIG. 10 is a schematic view illustrating still another apparatus for recording color picture information in accordance with this invention.

FIG. 10 illustrates a recording apparatus 420 according to still another embodiment of this invention that can be used to record color video signals on a monochrome photographic film 21. The recording apparatus 420 is shown to comprise a color television camera 421 of a type that is described in detail in my copending U.S. patent application Ser. No. 72,593, filed September 16, 1970, and having a common assignee herewith.

The camera 421 generally includes an image pickup tube 422 having a face plate assembly 423 at one end. As shown particularly on FIG. 11, the fact plate assembly 423 has a pair of index electrodes A (composed of elongated strip elements $A_1$, $A_2$, - - - $A_n$) and B (composed of elongated strip elements $B_1$, $B_2$, - - - $B_n$) disposed adjacent a photoconductive layer 424. The index electrodes A and B are formed of transparent conductive layers, for example, of tin oxide including antinomy, and they are arranged with their elements alternated, for example, in the order $A_1$, $B_1$, $A_2$, $B_2$, - - - $A_n$, $B_n$. The electrodes A and B are respectively connected to terminals $T_a$ and $T_b$ for connection with external circuits, and the electrodes A and B are disposed so that their elongated strip elements will extend vertically, that is, at right angles to the horizontal scanning direction of an electron beam produced by a gun 425 in tube 422.

The electrodes A and B are disposed at the back surface of a relatively thin glass plate 426, and a color filter F which may be made up of red, green and blue color filter elements $F_R$, $F_G$ and $F_B$ is provided against the front surface of plate 426 with the color filter elements being arranged in a repeating cyclic order and disposed parallel to the length of the elements of electrodes A and B. Further, each triad of red, green and blue color filter elements $F_R$, $F_G$ and $F_B$ is opposite to a respective pair of adjacent electrode elements $A_1$ and $B_1$, $A_2$ and $B_2$, - - - or $A_n$ and $B_n$. The color filter F is covered by a glass face plate 427 by which color filter F, electrodes A and B and photoconductive or photoelectric conversion layer 424 are enclosed or sealed within the envelope of tube 422.

As further shown on FIG. 10, the camera 421 includes a suitable deflection coil 428 by which the electron beam from gun 425 is made to scan photoconductive layer 424, and a lens 429 by which an image of the object 0 in the field of view of the camera is projected onto photoconductive layer 424.

The external circuits associated with camera 421 are shown to include a transformer 430 which includes a primary winding **430*a* and a secondary winding 430*b* having a midtap. The end terminals of secondary winding 430*b* are respectively connected to the terminals $T_A$ and $T_B$ of the image pickup tube 422, and the midtap of secondary winding 430*b* is supplied with a DC bias voltage of 10 to 50 V from a power source B+ through a resistor 431 and is further connected to an output terminal 432 through a capacitor 433. The primary winding 430*a* of the transformer is connected to a signal source 434 which produces an alternating signal having a rectangular wave 4**.

With such an arrangement, the electrodes A and B are alternately supplied with voltages higher and lower than the DC bias voltage for every period of the alternating signal from source 434, so that a striped potential pattern or index image corresponding to the arrangement of the electrodes A and B is formed on the surface of the photoconductive layer 424. At the same time, color filter F in cooperation with lens 429 provides a color separated image of the object 0 on the layer 424. Thus, when layer 424 is scanned by the electron beam from gun 425, a composite signal $E_p'$ appears at the output terminal 432 and contains a luminance signal $E_y$ and a chrominance signal $E_c$ determined by the color separated image on layer 424, and an index signal $\pm E_i$ having a frequency determined by the arrangement of the electrodes A and B with the phase of such index signal being reversed in successive periods of the alternating signal from source 434. If the alternating signal from source 434 has a period equal to that of the field scanning period, then the composite output signal $E_p'$ to which there is merely added a discrimination signal $E_d$, as hereinafter described, can be applied directly to the electron beam recorder 36 for recording on the monochrome photographic film 21. If the signal from source 434 alternates at the field frequency, the signal being recorded cannot be monitored during the recording operation.

Therefore, in the embodiment of the invention illustrated on FIG. 10, the alternating signal from source 434 is provided with a rectangular wave form having a pulse width equal to a horizontal scanning period of the electron beam so that the index signal $\pm E_i$ included in the composite signal $E_p'$ has its phase reversed in successive horizontal line scanning periods. In order to convert the line sequential signal $E_p'$ into a field sequential signal $E_p$ which is to be recorded on the film 21 in the electron beam recorder 36, the recording apparatus 420 of FIG. 10 has a preamplifier 435 which receives the composite signal $E_p'$ from output terminal 432 and supplies the amplified composite signal to a low-pass filter 436 and a band-pass filter 437. Low-pass filter 436 separates the luminance signal $E_y$ from the composite signal, and the separated luminance signal is supplied to an adder circuit 438. Band-pass filter 437 separates the chrominance and index signals ($E_c \pm E_i$) from the composite signal, and the separated chrominance and luminance signals ($E_c \pm E_i$) are supplied to an adder circuit 439, a subtracting circuit 440 and a delay circuit 441, for example, in the form of an ultrasonic delay line, having a delay time equal to one horizontal line scanning period. The output of delay circuit 441, that is, the chrominance and luminance signals ($E_c \pm E_i$) delayed by one horizontal line scanning period, is also supplied to adder circuit 439 and subtracting circuit 440 so that the chrominance signal $E_c$ and the line sequential index signal $\pm E_i$ are separately obtained at the outputs of adder circuit 439 and subtracting circuit 440, respectively.

The chrominance signal $E_c$ is supplied from the output of adder circuit 439 directly to one input of an electronic switching circuit 442 and, by way of an inverter 443, to a second input of switching circuit 442. Switching circuit 442 is controlled, as hereinafter described, so as to alternately pass the signals supplied to its two inputs in successive field scanning periods. Thus, the field sequential chrominance signal $\pm E_c$ is obtained at the output of switching circuit 442 and is supplied to adder circuit 438. In order to control switching circuit 442, as described above, a vertical synchronizing signal $S_v$ is suitably derived from the operating circuits of camera 421 and applied to a terminal $T_v$ for supply to a flip-flop circuit 444 which produces a control signal $S_q$ having its phase reversed in successive fields. Such control signal $S_q$ is applied to switching circuit 442 for switching the latter in the described manner so as to attain the field sequential chrominance signal $\pm E_c$.

The line sequential index signal $\pm E_i$ is fed through a limiter 445 to one input of an electronic switching circuit 446. The output of limiter 445 is further supplied to an inverter 447 which reverses the phase thereof to provide the line sequential index signal $\mp E_i$ which is supplied to another input of switching circuit 446. Switching circuit 446 is controlled by the signal from source or generator 434 so as to alternately pass the signals supplied to its two inputs in successive line scanning periods, whereby to obtain the index signal $E_i$ of constant phase which is fed to the adder circuit 438.

Finally, the recording apparatus 420 is further shown to include a frequency multiplier 448 which receives a portion of the horizontal synchronizing signal $S_h$ from a related terminal $T_h$, and by which the frequency of the horizontal synchronizing signal is multiplied to provide the discrimination signal $E_d$ with a frequency of about 100KHz. As shown, the horizontal synchronizing signal $S_h$ may also be supplied to the source or generator 434, as a control or synchronizing signal, whereby to ensure synchronization of the alternating signal supplied to the index electrodes A and B of camera 421 with the horizontal line scanning by the electron beam. The control signal $S_q$ having its phase reversed in successive fields is supplied from flip-flop circuit 44 to an AND circuit 449 along with the discrimination signal $E_d$ from frequency multiplier 448 and the vertical blanking signal $S_1$ from a related input terminal $T_1$ so that the AND circuit 449 will pass the discrimination signal $E_d$ only during the blanking period associated with every other field, for example, each odd-numbered field of the color video signal. Such discrimination signal $E_d$ is supplied from the output of AND circuit 449 to adder circuit 438. Thus, the field sequential composite signal $E_p = (E_y \pm E_d + E_i + E_d)$ appears at the output of adder circuit 438 and may be supplied to electron beam recorder 36 for recording on film 21.

It will be apparent that, in the recording apparatus 420 of FIG. 10, as in the recording apparatus shown on each of FIGS. 5 and 7, the chrominance signal included in the recorded composite signal is a dot sequential signal, that is, contains successive red, green and blue color signals, rather than merely two color-difference signals R–Y and B–Y, as in the embodiments of FIGS. 1 and 8. Thus, after the film 21 has been recorded in the apparatus of FIG. 10 and suitably developed, the color picture information recorded on film 21 can be reproduced in an apparatus similar to that of FIG. 9, but in which the demodulators 67R and 67B and an additional synchronous detector or demodulator for the green color signal are suitably controlled to obtain the respective signals R–Y, B–Y and G–Y. Of course, if desired, the color filter 87 employed in the recording apparatus of FIG. 5 or of FIG. 7, and the filter F employed in the recording apparatus of FIG. 10 may be suitably altered so as to obtain a chrominance signal included in the recorded composite signal which is made up of two color difference signals similar to the signals $E_r$ and $E_b$ included in the chrominance signal of the composite signal recorded by the apparatus by FIG. 1 or FIG. 8. In the event of such modification of the filter, film recorded in the apparatus of FIG. 5 or of FIG. 7 can be reproduced or played back by the reproducing apparatus of FIG. 4, and film recorded in the apparatus of FIG. 10 can be played back in the reproducing apparatus of FIG. 9 without modification of the reproducing apparatus.

In the recording apparatus shown on FIGS. 1, 5, 8 and 10, the actual recording on film 21 has been effected by an electron beam recorder 36. However, it should be noted that in each case, the electron beam recorder may be replaced by a flying-spot scanner of CRT which directs a beam of light, rather than an electron beam, against the film for exposing the latter.

Further, it is to be noted that the discrimination signal $E_d$ may be recorded at one side or the other of each odd-numbered frame, rather than between frames of the film 21, as shown.

It is also to be noted that, if desired, a hologram may be produced from the recorded film using the latter as the "object," whereupon the signal recorded as a hologram can be reproduced with application of this invention thereto, that is, with adding and subtracting of the chrominance and index signals separated from the recorded composite signal so as to separately obtain the chrominance signal and the index signal.

If desired, the film 21 may be provided with a magnetic track along one, or along both of its edges to receive magnetically recorded audio signals therein. Alternatively, a sound track may be recorded along one edge of film 21 by exposing such edge portion to a light beam having its intensity varied in accordance with the audio signal to be recorded, as in the ease of conventional sound motion picture film.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A method of recording and reproducing successive color picture fields each having luminance content and chrominance content, comprising exposing successive portions of an elongated strip of radiant energy-sensitive record medium to radiant energy, modulating said radiant energy for recording in each of said record medium portions information representing a composite signal which contains luminance and chrominance signals corresponding to the luminance and chrominance contents of a respective color picture field and also an index signal having the same frequency as the carrier of said chrominance signal and with the phase of only one of said chrominance and index signals being reversed for successive color picture fields, detecting said information recorded in the successive record medium portions so as to simultaneously reproduce first and second composite signals corresponding to two successive color picture fields, separating said chrominance and index signals from each of said first and second composite signals, separating said luminance signal from one of said reproduced composite signals, adding and subtracting said chrominance and index signals separated from said first and second composite signals, respectively, to obtain said chrominance signal and said index signal separate from each other, phase shifting the separated index signal, and demodulating the separated chrominance signal by means of the phase shifted index signal for obtaining color difference signals which, with the separated luminance signal, define a respective color picture field.

2. A method according to claim 1, in which said record medium is monochrome photographic film, and said successive portions of the record medium are constituted by successive frames of said film.

3. A method according to claim 1, in which said one of the chrominance and index signals which is obtained by said subtracting is subjected to phase reversing and then combined, in alternate fields, with said one signal as obtained by said subtracting for producing said one signal with its phase unchanged in successive fields.

4. A method according to claim 3, in which said information recorded in the record medium portion for every other color picture field further represents a discriminating signal so that the reproduced composite signal corresponding to said every other color picture field further contains said discriminating signal, and further comprising separating said discriminating signal, if any, from said second reproduced composite signal, and controlling the combining, in alternate fields, of said phase reversed one signal with said one signal as obtained from said subtracting by means of said discriminating signal separated from said second composite signal.

5. A method according to claim 4, further comprising separating said discriminating signal, if any, from said first reproduced composite signal, combining the discriminating signals separated from said first and second reproduced composite signals to provide a control signal for each field, producing a vertical synchronizing signal from the combined discriminating signals, and adding said vertical synchronizing signal to said luminance signal separated from said one composite signal.

6. Apparatus for recording and reproducing successive color picture fields each having luminance content and chrominance content, comprising means for exposing successive portions of an elongated strip of radiant energy-sensitive record medium to radiant energy, means for modulating said radiant energy so as to record, in each of said record medium portions, information representing a composite signal which contains luminance and chrominance signals corresponding to the luminance and chrominance contents of a respective color picture field and also an index signal having the same frequency as the carrier of said chrominance signal and with the phase of only one of said chrominance and index signals being reversed for successive color picture fields, means for detecting the information recorded in the successive record medium portions and for simultaneously reproducing first and second composite signals corresponding to two successive color picture fields, means for separating said chrominance and index signals from each of said first and second reproduced composite signals, means for separating said luminance signal from one of said reproduced composite signals, adding and subtracting means for adding and for subtracting said chrominance and index signals separated from said first and second reproduced composite signals, respectively, to obtain said chrominance signal and said index signal separate from each other, means for shifting the phase of the separated index signal, and means for demodulating the separated chrominance signal with the phase shifted index signal so as to obtain color difference signals which, with the separated luminance signal, define a respective color picture field.

7. Apparatus according to claim 6, in which means are provided for producing said composite signal to be recorded and are in the form of a color television camera including a scanning surface adapted to convert light projected thereon into an electrical output, means including a color filter disposed between an object in the field of view of the camera and said scanning surface for forming a color separated image of the object on said scanning surface, and means for projecting light of alternately complementary colors through said filter onto said scanning surface to form on said scanning surface an index image in overlapping relation with said color separated image, said complementary colors of light projected through the filter being alternated in successive fields, so that said electrical output of the camera constitutes said composite signal containing a luminance signal and a chrominance signal corresponding to said color separated image and an index signal corresponding to said index image.

8. Apparatus according to claim 7, in which said filter includes a main portion composed of filter elements respectively transmitting light of primary colors to form said color separated image of the object, and a peripheral portion of said filter is composed of alternating elements which are respectively black and capable of transmitting one of the complementary colors of light projected through said filter for providing a discriminating signal in said electrical output for every other field.

9. Apparatus according to claim 6, in which said means for exposing successive portions of the record medium to radiant energy and for modulating the radiant energy include drive means for intermittently moving said record medium in the longitudinal direction so as to dispose the successive portions thereof at a recording station, means including a color filter for projecting a color separated image of an object in the field of view of the apparatus directly onto the record medium portion disposed at said record station while said record medium is at rest, means for projecting light of alternately complementary colors through said filter onto said record medium portion at rest at said recording station to form an index image on said record medium portion in overlapping relation with said color separated image, and control means synchronized with said drive means for alternating said complementary colors of light projected through said filter in correspondence with the disposition of successive portions of said record medium at said recording station.

10. Apparatus according to claim 9, in which said filter includes a main portion composed of filter elements respectively transmitting light of primary colors to form said color separated image of the object, and a peripheral portion of said filter is composed of alternating elements which are respectively black and capable of transmitting one of the complementary colors of light projected through said filter for providing a discriminating signal image adjacent the medium portion corresponding to every other field.

11. Apparatus according to claim 6, in which means are provided for producing said chrominance and index signals and includes input means for respectively receiving two color difference signals and a horizontal synchronizing signal, two modulating means respectively receiving said two color difference signals from the respective input means, frequency multiplier means receiving said horizontal synchronizing signal and producing therefrom a carrier and index signal at said predetermined carrier frequency which is supplied directly to one of said modulating means for modulation by the respective one of said color difference signals, phase shifting means receiving said carrier signal and providing a phase-shifted carrier signal supplied to the other of said modulating means for modulation by the other of said color difference signals and means for adding together the outputs of said two modulating means to provide said chrominance signal, and means are further provided for adding said chrominance signal to said index signal and to the luminance signal for constituting said composite signal.

12. Apparatus according to claim 11, in which means are provided for reversing the phase of said one signal in successive fields and includes phase inverting means receiving the added together outputs of said two modulating means for providing a phase-inverted chrominance signal, and combining means alternated in successive fields for alternately combining said chrominance signal represented by said added together outputs of the modulating means and said phase-inverted chrominance signal.

13. Apparatus according to claim 11, in which means are provided for reversing the phase of said one signal in successive fields and includes phase inverting means receiving the output of said frequency multiplier means for providing a phase-inverted index signal, and combining means alternated in successive fields for alternately combining the index signal represented by the output of said frequency multiplier means and said phase-inverted index signal.

14. Apparatus according to claim 6, in which means are provided for producing said composite signal to be recorded and are in the form of a color television camera including a photoconductive surface for the electrical conversion of images projected thereon into an electrical output, color filter means disposed between said surface and an object in the field of view of the camera for forming a color-separated image of said object on said surface, first and second indexing electrodes disposed in close proximity to said surface, and circuit means for applying different potentials alternated in successive periods of said electrical output to said indexing electrodes so as to electrically form an index image on said surface, whereby said electrical output forms a composite signal containing chrominance and luminance signals corresponding to said color separated image and an index signal corresponding to said index image, with the phase of said index signal being reversed in said successive periods.

15. Apparatus according to claim 14, in which said different potentials are alternated in successive field periods and said electrical output is applied directly, as said composite signal, to said means for modulating the radiant energy.

16. Apparatus according to claim 14, in which said different potentials are alternated in successive line scanning periods of said electrical output, and further comprising means for separating said luminance signal and said chrominance and index signals from said electrical output, delay means receiving said separated chrominance and index signals and delaying the latter by one line scanning period, adding means for adding said separated chrominance and index signals and the output of said delay means to provide, as its output, said chrominance signal alone, means for converting said output of the adding means into said chrominance signal reversing phase in successive field periods, subtracting means for subtracting said separated chrominance and index signals and said output of the delay means to provide, as its output, said index signal reversing phase in successive line scanning periods, means for converting said output of the subtracting means into said index signal with constant phase in successive field periods, and means for combining said separated luminance signal, said chrominance signal reversing phase in successive field periods and said index signal with constant phase to constitute said composite signal for modulation of said radiant energy.

17. Apparatus according to claim 6, further comprising phase reversing means for reversing the phase of the output of said subtracting means, and combining means for combining, in alternate fields, the output of said phase reversing means and the output of said subtracting means for obtaining said one of the chrominance and index signals with the phase thereof unchanged in successive fields.

18. Apparatus according to claim 17, in which said composite signals recorded in the record medium portions corresponding to every other field of color picture information further each contain a discriminating signal, and further comprising means for separating said discriminating signal, if any, from said second reproduced composite signal, and means responsive to said discriminating signal separated from said second reproduced composite signal for controlling said combining means.

19. Apparatus according to claim 18, further comprising means for separating said discriminating signal, if any, from said first reproduced composite signal, means for producing a vertical synchronizing signal in response to the discriminating signals separated from said first and second reproduced composite signals, and means for adding said vertical synchronizing signal to said luminance signal separated from said one composite signal.

20. Apparatus for recording successive fields of color picture information in successive portions of an elongated strip of radiant energy-sensitive record medium, comprising means for producing a quadrature phase modulated chrominance signal having a predetermined carrier frequency, an index signal having the same frequency as said carrier frequency, and a luminance signal, means for reversing the phase of one of said chrominance and index signals in successive fields, means for combining said one signal having phase reversal in successive fields with the other of said chrominance and index signals and with said luminance signal to provide a composite signal, means for scanning the record medium with a radiant energy beam at a predetermined rate so that each of said record medium portions is scanned in a respective field period of the color picture information to be recorded, and means for modulating the intensity of said beam with said composite signal.

21. Apparatus according to claim 20, further comprising means for producing a discriminating signal having a frequency substantially lower than the frequency band of said chrominance signal, and means for combining said discriminating signal with said chrominance, index and luminance signals only for every other field of color picture information so as to include said discriminating signal in said composite signal for said every other field.

22. Apparatus according to claim 20, in which said means for producing said chrominance, index and luminance signals includes input means for respectively receiving two color difference signals, a luminance signal and a horizontal synchronizing signal, two modulating means respectively receiving said two color difference signals from the respective input means, frequency multiplier means receiving said horizontal synchronizing signal and producing therefrom a carrier and index signal at said predetermined carrier frequency which is supplied directly to one of said modulating means for modulation by the respective one of said color difference signals, phase shifting means receiving said carrier signal and providing a phase-shifted carrier signal supplied to the other of said modulating means for modulation by the other of said color difference signals, and means for adding together the outputs of said two modulating means to provide said chrominance signal.

23. Apparatus according to claim 22, in which said means for reversing the phase of said one signal in successive fields includes phase inverting means receiving the added together outputs of said two modulating means for providing a phase-inverted chrominance signal, and combining means alternated in successive fields for alternately combining said chrominance signal represented by said added together outputs of the modulating means and said phase-inverted chrominance signal.

24. Apparatus according to claim 22, in which said means for reversing the phase of said one signal in successive fields includes phase inverting means receiving the output of said frequency multiplier means for providing a phase-inverted index signal, and combining means alternated in successive fields for alternately combining the index signal represented by the output of said frequency multiplier means and said phase-inverted index signal.

25. Apparatus for recording successive fields of color picture information in successive portions of an elongated strip of radiant energy-sensitive record medium, comprising a color television camera including a scanning surface adapted to convert light projected thereon into an electrical output means including a color filter disposed between an object in the field of view of the camera and said scanning surface for forming a color separated image of the object on said scanning surface, and means for projecting light of alternately complementary colors through said filter onto said scanning surface to form on said scanning surface an index image in overlapping relation with said color separated image, said complementary colors of light projected through the filter being alternated in successive fields, so that said electrical output of the camera constitutes a composite signal containing a luminance signal and a chrominance signal corresponding to said color separated image and an index signal corresponding to said index image, means for scanning the record medium with a radiant energy beam at a predetermined rate so that each of said record medium portions is scanned in a respective field period of said composite signal, and means for modulating the intensity of said beam with said composite signal.

26. Apparatus according to claim 25, in which said filter includes a main portion composed of filter elements respectively transmitting light of primary colors to form said color separated image of the object, and a peripheral portion of said filter is composed of alternating elements which are respectively black and capable of transmitting one of the complementary colors of light projected through said filter for providing a discriminating signal in said electrical output for every other field.

27. Apparatus for recording successive fields of color picture information in successive portions of an elongated strip of radiant energy-sensitive record medium, comprising a color television camera including a photoconductive surface for the electrical conversion of images projected thereon into an electrical output, color filter means disposed between said surface and an object in the field of view of the camera for forming a color-separated image of said object on said surface, first and second indexing electrodes disposed in close proximity to said surface, and circuit means for applying different potentials alternated in successive periods of said electrical output to said indexing electrodes so as to electrically form an index image on said surface, whereby said electrical output forms a composite signal containing chrominance and luminance signals corresponding to said color separated image and an index signal corresponding to said index image, with the phase of said index signal being reversed in said successive periods, means for scanning the record medium with a radiant energy beam at a predetermined rate so that each of said record medium portions is scanned in a respective field period of said composite signal, and means for modulating the intensity of said beam with said composite signal.

28. Apparatus according to claim 27, in which said different potentials are alternated in successive field periods and said electrical output is applied directly, as said composite signal, to said means for modulating the beam.

29. Apparatus according to claim 27, in which said different potentials are alternated in successive line scanning periods of said electrical output, and further comprising means for separating said luminance signal and said chrominance and index signals from said electrical output, delay means receiving said separated chrominance and index signals and delaying the latter by one line scanning period, adding means for adding said separated chrominance and index signals and the output of said delay means to provide, as its output, said chrominance signal alone, means for converting said output of the adding means into said chrominance signal reversing phase in successive field periods, subtracting means for subtracting said separated chrominance and index signals and said output of the delay means to provide, as its output, said index signal reversing phase in successive line scanning periods, means for converting said output of the subtracting means into said index signal with constant phase in successive field periods, and means for combining said separated luminance signal, said chrominance signal reversing phase in successive field periods and said index signal with constant phase to constitute said composite signal for modulation of said beam.

30. Apparatus for recording successive fields of color picture information in successive portions of an elongated strip of radiant energy-sensitive record medium, comprising drive means for intermittently moving said record medium in the longitudinal direction so as to dispose the successive portions thereof at a recording station, means including a color filter for projecting a color separated image of an object in the field of view of the apparatus directly onto the record medium portion disposed at said record station while said record medium is at rest, means for projecting light of alternately complementary colors through said filter onto said record medium portion at rest at said recording station to form an index image on said record medium portion in overlapping relation with said color separated image, and control means synchronized with said drive means for alternating said complementary colors of light projected through said filter in correspondence with the disposition of successive portions of said record medium at said recording station.

31. Apparatus according to claim 30, in which said filter includes a main portion composed of filter elements respectively transmitting light of primary colors to form said color separated image of the object, and a peripheral portion of said filter is composed of alternating elements which are respectively black and capable of transmitting one of said complimentary colors of light projected through the filter for providing a discriminating image projected onto said record medium adjacent every other one of said record medium portions.

32. An apparatus for reproducing successive fields of recorded color picture information, comprising an elongated strip of radiant energy-sensitive record medium having successive frame portions thereof each recorded with a composite signal representing a respective field of color picture information and containing a quadrature phase modulated chrominance signal having a predetermined carrier frequency, an index signal of the same frequency as said carrier frequency and a luminance signal, and in which the phase of one of said chrominance and index signals is reversed for successive fields, means for reproducing the composite signals recorded in two adjacent frame portions of said record medium so as to provide first and second reproduced composite signals, means for separating said luminance signal from one of said reproduced composite signals, adding and subtracting means for adding and for subtracting said chrominance and index signals separated from said first and second reproduced composite signals, respectively, to obtain said chrominance signal and said index signal separate from each other, means for shifting the phase of the separated index signal, and means for demodulating the separated chrominance signal with the phase shifted index signal so as to obtain color difference signals which, with the separated luminance signal, define a respective color picture field.

33. Apparatus according to claim 32, further comprising phase reversing means for reversing the phase of the output of said subtracting means, and combining means for combining, in alternate fields, the output of said phase reversing means and the output of said subtracting means for obtaining said one of the chrominance and index signals with the phase thereof unchanged in successive fields.

34. Apparatus according to claim 33, in which said composite signals recorded in the record medium frame portions corresponding to every other field of color picture information further each contain a discriminating signal, and further comprising means for separating said discriminating signal, if any, from said second reproduced composite signal, and means responsive to said discriminating signal separated from said second reproduced composite signal for controlling said combining means.

35. Apparatus according to claim 34, further comprising means for separating said discriminating signal, if any, from said first reproduced composite signal, means for producing a vertical synchronizing signal in response to the discriminating signals separated from said first and second reproduced composite signals, and means for adding said vertical synchronizing signal to said luminance signal separated from said one composite signal.

36. An elongated strip of radiant energy-sensitive record medium having successive frame portions each recorded with a composite signal representing a respective field of color picture information and containing a quadrature phase modulated chrominance signal having a predetermined carrier frequency, an index signal of the same frequency as said carrier frequency and a luminance signal, and in which the phase of one of said chrominance and index signals contained in the composite signal recorded in successive frames is reversed.

37. An elongated strip of radiant energy-sensitive record medium according to claim 36, in which there is further recorded, adjacent each of said frame portions corresponding to every other field of color picture, discriminating signal having a frequency substantially below the frequency band of said chrominance signal.

* * * * *